United States Patent [19]

Kusunoki et al.

[11] 4,019,009
[45] Apr. 19, 1977

[54] MICROWAVE HEATING APPARATUS

[75] Inventors: Shigeru Kusunoki, Yamatokoriyama; Teruhisa Takano, Osaka; Noboru Kurata, Yamatokoriyama, all of Japan

[73] Assignee: Matsushita Electric Industrial Co., Ltd., Osaka, Japan

[22] Filed: Feb. 6, 1975

[21] Appl. No.: 547,746

[30] Foreign Application Priority Data

Feb. 8, 1974 Japan .................... 49-16623

[52] U.S. Cl. ................. 219/10.55 F; 333/95 S
[51] Int. Cl.² ........................................ H05B 9/06
[58] Field of Search ........... 219/10.55 F; 333/95 S, 333/95 R

[56] References Cited

UNITED STATES PATENTS

| | | | |
|---|---|---|---|
| 2,659,817 | 11/1953 | Cutler | 333/95 S |
| 2,704,802 | 3/1955 | Blass et al. | 219/10.55 F |
| 2,909,635 | 10/1959 | Haagensen | 219/10.55 F |
| 3,478,187 | 11/1969 | Agdur et al. | 219/10.55 F |
| 3,591,751 | 7/1971 | Goltsos | 219/10.55 F |
| 3,788,728 | 1/1974 | Nassenstein | 333/95 S |
| 3,801,939 | 4/1974 | Lamy et al. | 333/95 R |
| 3,810,248 | 5/1974 | Risman et al. | 219/10.55 F |

FOREIGN PATENTS OR APPLICATIONS

| | | | |
|---|---|---|---|
| 597,088 | 4/1960 | Canada | 219/10.55 F |
| 1,066,678 | 10/1959 | Germany | 219/10.55 F |
| 1,070,311 | 12/1959 | Germany | 219/10.55 |

*Primary Examiner*—Arthur T. Grimley
*Attorney, Agent, or Firm*—Wenderoth, Lind & Ponack

[57] ABSTRACT

There is disclosed a microwave heating apparatus which includes a source of high frequency electromagnetic energy which generates microwaves having a predetermined operating wave length, a heating chamber to accommodate therein a material to be heated, a spatial arrangement to transmit microwaves generated by the source, and a surface wave transmission circuit or line positioned between the chamber and the spatial arrangement. The microwave power from the source is coupled to the spatial arrangement and possibly to the chamber. Heating of a material to be heated takes place as the high frequency electromagnetic waves impinge upon the material and penetrate thereinto.

12 Claims, 23 Drawing Figures

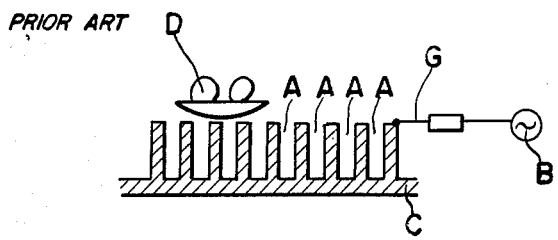
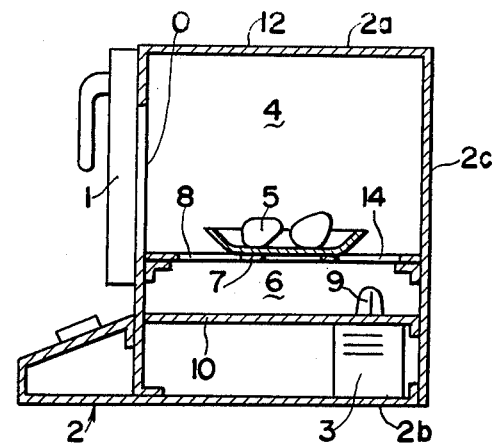
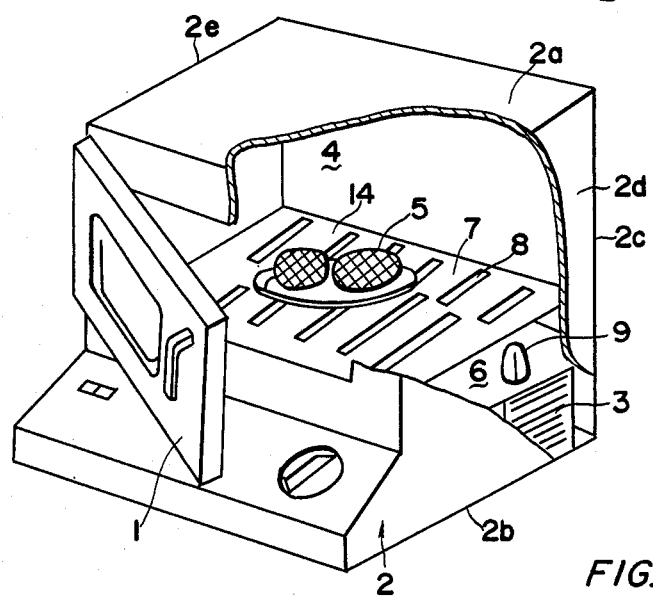
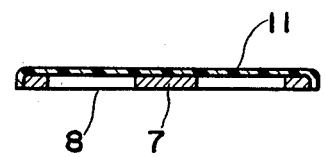
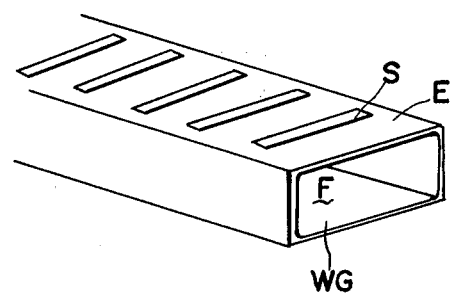

(a)

(b)

(a)

(b)

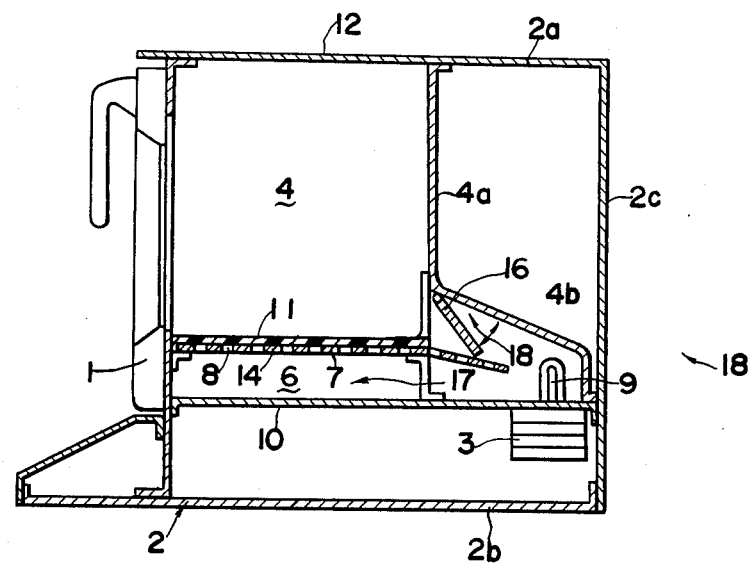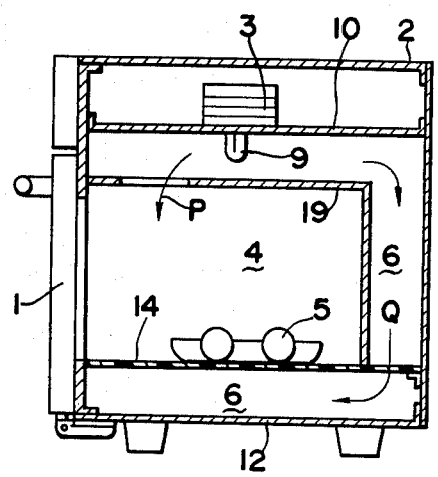

MICROWAVE HEATING APPARATUS

BACKGROUND OF THE INVENTION

The present invention relates to a microwave heating apparatus and, more particularly, to a microwave heating apparatus which utilizes the surface-wave mode of microwave propagation.

A microwave heating apparatus utilizing the surface-wave mode of microwave propagation is known as having various features because high frequency electromagnetic energy (microwave energy generated by a high frequency electromagnetic wave generator or a magnetron tends to be centered on the surface of a surface-wave transmission line. Some of these features, which can be appreciated when a dielectric material to be heated or heat-treated, such as a foodstuff or a web of cloth, is subjected to high frequency electromagnetic surface-waves by placing it on or to the surface of the surface-wave transmission line, are that the dielectric material can readily be heated in a relatively highly efficient manner, that the dielectric material, in the case of a foodstuff, can be browned or scorched which cannot otherwise be achieved by a known microwave oven, that a substantially uniform distribution of high frequency electromagnetic waves can be obtained and that a device, and its associated accessories, for preventing the leakage of microwave energy which is to be incorporated in the microwave heating apparatus of the type referred to above, can be simplified.

The surface wave transmission mode is known as one of the modes of propagation of high frequency electromagnetic energy and is largely utilized in various fields of microwave engineering and, particularly, in a wave guide duct or a transmission line. The microwave surface transmission has the following properties.

First, the intensity of surface waves generated by the high frequency electromagnetic wave generator tends to exponentially decrease as the surface waves travel away from the surface of the transmission system in a direction perpendicular to the direction of transmission of the surface waves and, therefore, no electromagnetic power is propagated nor radiated in this direction.

Secondly, the surface waves travel at a phase velocity smaller than the velocity of travel of a light beam.

It is well known that, as a circuit for surface transmission of microwaves, a dielectric flat-surfaced structure or a corrugated electroconductive plate has been employed. Various attempts have heretofore been proposed to apply the microwaves travelling along a surface structure to a heating apparatus, one type of which attempts is disclosed in the U.S. Pat. No. 3,478,187, patented on Nov. 11, 1969, and it has been found that all of these attempts are directed to utilization of the first mentioned property and that these attempts can successfully be practiced so far as continuous drying of a sheet-like material such as a film or a cloth is concerned. However, the conventional method of heating the dielectric material by the use of the surface wave mode of microwave propagation has the following disadvantages because of the nature of the arrangement of a surface wave transmission circuit which will now be described with particular reference to FIG. 1, which shows a schematic sectional view of a corrugated metallic surface for the purpose of explanation of the principle of the circuit arrangement.

Referring to FIG. 1, the corrugated metallic surface forming a surface transmission circuit is designated by C and is coupled to a source of high frequency electromagnetic waves B through a coupling circuit G. When the source of high frequency electromagnetic waves B, such as a magnetron, is operated, microwaves generated thereby travel towards and along the corrugated surface. During the operation of the magnetron B, corrugations on the metallic surface C, each pair of the adjacent members of which corrugations defines a stub A, are electromagnetically coupled to each other by means of the respective stubs A at a portion adjacent the crest or top of the corrugations.

In the heating apparatus of the type employing the corrugated metallic surface referred to above, since a material to be heated D is adapted to be placed on the corrugated metallic surface bridging over some or all of the stubs A and among some or all of the corrugations, the condition in which the corrugations are electromagnetically coupled to each other considerably varies as the condition of the material to be heated D varies. More specifically, high frequency electromagnetic energy derived from high frequency electromagnetic waves travelling along the surface and over the stubs A tends to be fed towards the left of the drawing of FIG. 1 sequentially propagating over the respective stubs A. However, the presence of the material to be heated D on the corrugated surface causes a substantially complete loss of the high frequency electromagnetic energy at a position rearwardly of the material to be heated D with respect to the direction of transmission of the high frequency electromagnetic surface travelling waves. This means that the material to be heated D is heat-treated in such a manner that a portion of material D which faces the magnetron B tends to be extensively heated while the opposite portion of the same material D remote from the magnetron B tends to be underheated, and that oscillation of the surface waves tends to be disturbed especially at a portion occupied by the material D and a portion rearwardly of the material D remote from the magnetron B.

According to a series of experiments conducted by the inventors, it has been found that, in the case where water is employed fr the material to be heated, the surface wave mode is disturbed at a position rearwardly of a glass cup with the water and with the high frequency electromagnetic energy available at that position being reduced to about one-fifth of that available at a position on the other side of the water-filled cup which is close to the magnetron. Accordingly, in the case where two or more separate materials to be simultaneously heated are arranged one behind the other in a direction parallel to the direction of travel of the wave front, they cannot be uniformly heated. In view of this, such a heating apparatus as hereinbefore described cannot be used as a household kitchen utensil, as it will not exhibit the required performance, because the shape and type of individual materials to be heated are not fixed.

For the reason described above, the surface wave transmission circuit in the form of the corrugated metallic surface of the construction shown in FIG. 1 has the following disadvantages:

1. Because of the complicated shape, the corrugated surface cannot easily be manufactured without difficulty.
2. Since the space wherein the surface waves are propagated and the space in which a material to be heated are the same, the device cannot accommodate changes of the shape and type of material to be heated.

3. The device cannot be utilized other than for continuously drying a cloth or like sheet material to be heated. In other words, where a material to be heated, which has a relatively great thickness, is heated solely relying on the surface waves, since the surface wave distribution tends to exponentially decrease as the surface waves travel away from the surface of the transmission system as hereinbefore described, a sufficient and required amount of high frequency electromagnetic energy will not penetrate deep into the material to be heated. Consequently, there is a disadvantage that only a portion of the material which faces the surface is heated and, therefore, the device cannot be utilized other than in continuous drying of a sheet-like material or material having a relatively small thickness.

There is known another type of microwave heating apparatus utilizing a surface wave transmission circuit in the form of a wave-guide. As shown in FIG. 4 of the accompanying drawings, the waveguide WG has one wall member E formed with a plurality of equally spaced slits S and, therefore, is generally referred to as a ladder type surface wave transmission line. In this apparatus, since a sheet-like material, for example, a film, to be heated is continuously fed along the outside of the wall member E in such a manner as to cover the equally spaced slits S while high frequency electromagnetic energy, which oscillates the surface waves, is guided within the interior F of the waveguide WG, the second mentioned disadvantage described above can be substantially eliminated. However, in the above described apparatus having the waveguide of the construction shown in FIG. 4, no substantial measure are taken to protect the human or user from being exposed to the high frequency electromagnetic energy radiated to the outside of the apparatus. Moreover, the apparatus utilizing the waveguide involves the third mentioned disadvantage described above.

SUMMARY OF THE INVENTION

Accordingly, the present invention has been made with a view to substantially eliminating the above described, various disadvantages and the primary object of the invention is to provide a microwave heating apparatus wherin means is provided for utilizing both the surface waves and the conventional microwaves for heating purposes.

Another object of the present invention is to provide a microwave heating apparatus having a relatively high heating efficiency which is capable of sufficiently heating a material to be heated which has a relatively great thickness.

A further object of the present invention is to provide a microwave heating apparatus which can be operated by the user with a relatively high degree of security against microwave hazards.

BRIEF DESCRIPTION OF THE DRAWINGS

These and other objects and features of the present invention will become apparent from the following description taken in conjunction with preferred embodiments thereof with reference to the accompanying drawings, in which:

FIG. 1 is a schematic sectional view of the prior art surface wave transmission circuit, which has been employed to show the principle of heating by the use of the surface waves, FIG. 2 is a schematic perspective view, with a portion broken away, of a heating apparatus according to one embodiment of the present invention, FIG. 3 is a side sectional view of the apparatus shown in FIG. 2, FIG. 4 is a schematic perspective view of an essential portion of a ladder type waveguide, FIG. 5 is a schematic sectional view of a surface wave transmission circuit, FIG. 14 is a schematic side sectional view of the heating apparatus according to a further embodiment of the present invention, FIG. 15 is a schematic side sectional view of the heating apparatus according to a still further embodiment of the present invention, FIG. 16 is a schematic side sectional view of the heating apparatus according to a still further embodiment of the present invention.

DETAILED DESCRIPTION OF THE INVENTION

Figure 6:
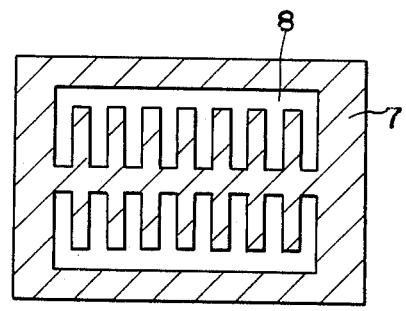
FIGS. 6 to 12 illustrate respective modifications of the surface wave transmission circuit which can advantageously be in the present invention.

Before the description of the present invention proceeds, it should be noted that like parts are designated by like reference numerals throughout the accompanying drawings.

Referring now to FIGS. 2 and 3, there is shown a microwave heating apparatus of the present invention, which comprises a cubic outer casing 2 formed with six walls including upper and lower walls 2a and 2b, a rear wall 2c, two side walls 2d and 2e and a front wall constituted by a hingedly supported door 1 with the hinge axis of door 1 located adjacent to one side edge of the door for selectively opening and closing the opening 0 defined by the walls 2a and 2e. An object 5 to be heated disposed in a non-metallic vessel or utensil 5' is adapted to be inserted through the opening 0, when the door 1 is opened, into a heatig chamber 4 and placed therein for support on a metallic plate or shelf 7, which plate 7 has at least one set of a plurality of substantially high impedance patterns 8, each in the form of a slot, the patterns or slots 8 being equally spaced from each other in a predetermined pitch as shown in FIG. 2 so as to form a surface wave transmission line 14 for microwaves.

The plate 7 is spaced away from a bottom plate 10 of the heating chamber 4 to provide a space 6 therebetween to permit passage of microwaves. In a space formed between the bottom plate 10 of the chamber 4 and the lower wall 2b of the apparatus casing 2 and in a position adjacent to the rear wall 2c, there is disposed a magnetron assembly 3, or any other high frequency electromagnetic wave generator, for generating microwaves with an antennas thereof for radiating the microwaves projecting to a certain extent into the space 6.

The surface wave transmission line 14 employed in the embodiment of FIGS. 2 and 3 is a ladder-type network, which ladder-type network is produced with reference to FIG. 4 by forming a set of a plurality of slots S which are approximately equally spaced from each other on one side wall E of a waveguide WG having a space F therein. It is commonly known that, in order to oscillate a surface wave transmission mode on and over a metallic plate impedance elements for electric waves, such as slots, must be formed on the metallic plate at such equal intervals as to satisfy a certain or predetermined relationship.

The relation between FIGS. 2 and FIG. 3 and FIG. 4 is such that the space F of the waveguide WG corresponds to the space 6, while the side wall E and the slots S of FIG. 4 correspond to the plate 7 and the slots 8 of FIGS. 2 and 3, respectively. According to this embodiment of the present invention, the microwaves radiated from the antenna 9 of the magnetron assembly pass through the space or wave passage 6 with the surface wave propagated over the set of slots 8 which are equally spaced from each other, the surface wave thus propagated heating the object 5 which has been placed on the metallic plate 7. In this case, as described with reference to the first mentioned property of the surface wave transmission, the microwave energy is distributed in exponential function with the spacing away thereof upwardly from the surface wave transmission line 14, from which fact the microwave energy is concentrated upon the object to be heated which has been placed on the surface wave transmission line 14.

In the microwave heating apparatus of the present invention, unlike the conventional electronic oven wherein electric waves are radiated into the entire space of the heating chamber, the energy density in the vicinity of the object 5 to be heated is increased with the consequent increase of the heating efficiency in general. Furthermore, in the apparatus of the present invention, since the degree of energy concentration can be advantageously altered by properly setting the size of the slits 8 and the intervals therebetween, the apparatus may be designed to suit such objects to be heated as will be most frequently dealt with, and depending on the individual situation, surface wave transmission lines formed with various patterns may by prepared in advance for replacement as separate attachments according to the types of objects to be heated. Additionally, in actual practice, it is desirable that a dielectric material 11, for example, of plastic material be placed on the plate 7 to cover the slots 8 thereby as shown in FIG. 5.

As is seen from the above description, in the heating apparatus of the present invention, the microwave energy for propagating the surface waves is adapted to be supplied through the passage 6 formed below the surface wave transmission line 14 so that the disadvantage discussed under the item (2) above, which is inherent in the prior art apparatus, can be eliminated. Another favorable effect from the provision of the electric wave passage 6 in the apparatus of the present invention is that, by arranging more than one electric wave mode to be present in the passage 6 through proper selection of the width, height and length of the passage 6, various states of energy density can be obtained on the surface wave transmission line, since surface waves propagated corresponding to various modes are different in the states thereof from each other. In the extreme case, the wave is radiated into the space of the heating chamber 4 as electric waves other than the surface wave through the slots 8 or other crevices in the apparatus, by the utilizaton of which phenomenon, it is possible to fully heat any object larger in thickness than ordinary objects. In this case, also, part of the energy propagated is converted into surface waves so as to concentrate in the vicinity of the object to be heated with a resultant improvement of the heating efficiency.

Moreover, depending on the design of each part of the apparatus of the invention, part of the walls of the heating chamber 4, for example, the upper wall 2a, may be constituted by an electric wave penetrating substance, for example, a plastic material. The position of the magnetron assembly described as installed adjacent to the rear wall 2c in the lower portion of the casing 2 may be installed at a central portion of the apparatus without any substantial difference in the functioning of the apparatus. Similarly, electrical supply to the apparatus through a waveguide can be readily thought of as a modification of the present invention with minor alterations in the construction.

Reference is now made to FIGS. 6 to FIG. 12, wherein outstanding modifications of the surface wave transmission line of the embodiment of FIGS. 2 and 3 are shown.

Figure 7:
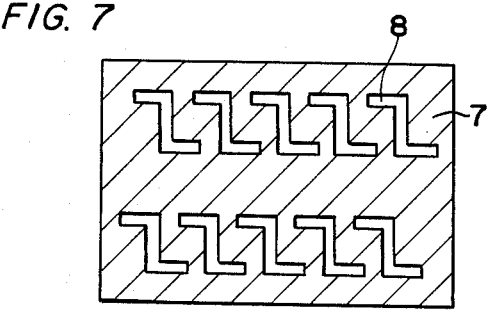
Figure 8:
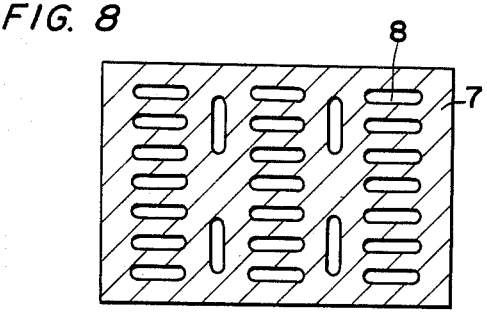

In each of the modifications shown in FIGS. 6 to 8, respectively, the hatched portion 7 is composed of a metallic electrically conductive material with sets of a plurality of slots 8 formed therein at substantially equally spaced intervals. It is needless to say that a similar effect can be expected even when the portion 8 corresponding to the slots is formed by metallic materials with the hatched portion 7 made of dielectric material. Furthermore, materials, for example, of glass, plastics, etc., may suitably be placed on the plate 7 to cover the sots 8, in which process various known methods, such as sheet metal working, etching of a printed board, or electroplating on a resinous material, etc., can be employed.

Specifically, in the modification of FIG. 6, the slots are connected to each other by a coupling slot extending at righ angles to such slots. The advantage of this arrangement is that, since the microwave energies can be also coupled by the coupling slot connecting the slots to each other, such microwave energies as supplied through the transmission space cooperated with such microwave energies as supplied through the coupling slot so as to accelerate propagation of the surface waves. A similar advantage can be appreciated even if the elements 8 are made of metal while the element 7 is made of dielectric material or formed into a shaped opening or void.

The arrangement of FIG. 6 may further be modified in such a manner as subsequently described. That is, one group of slots 8 may be displaced relative to the other group of slots 8 a distance substantially equal to the pitch between each adjacent two of the sawtooth portions of the slots of each group, in which case a different pattern of distribution of the surface waves can be obtained. It is to be noted that these groups of slots thus displaced may also be arranged such that the sawtooth portions of the slots of one group project into associated spaces each defined between adjacent two of the sawtooth portions of the slots of the other group so that the slots can be coupled to each other in a substantially zig-zag manner.

In any event, the number of groups of the slots is not limited to two such as shown, but may be more than two, in which case a relatively large area in which the surface waves are oscillated can be obtained.

Figure 9:
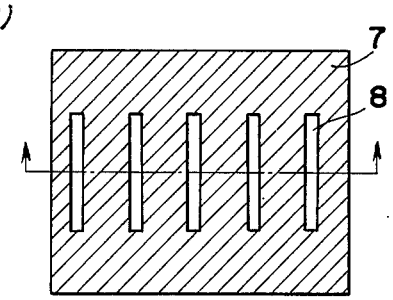
Figure 9:
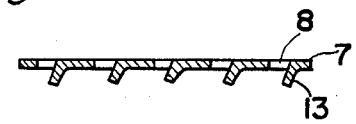

Referring to FIGS. 9(a) to 12, there are shown further modifications of the surface wave transmission line 14 of the embodiment of FIGS. 2 and 3. In the modification of FIGS. 9(a) and (b), the metallic plate 7 is provided with a set of a plurality of slots 8, each of which slots 8 is formed by punching in the plate 7 with one long edge of the punched portion of the plate 7 bent outward at an angle to one primary surface of the plate 7 to form a projecting 13 as in FIG. 9(b) for improving the directivity of the surface wave, while in the modification of FIGS. 10(a) and (b), the metallic plate 7 is provided ith a set of plurality of plates or teeth $t$ each extending outwardly at right angles from one primary surface of the plate 7 in a direction parallel to one of said plate 7, with the teeth $t$ equally spaced from each other and with two slots 8 formed in the plate 7 in a directional normal to the teeth $t$, as combining openings for the surface wave propagation, slots 8 being suitably spaced from each other.

Figure 11:
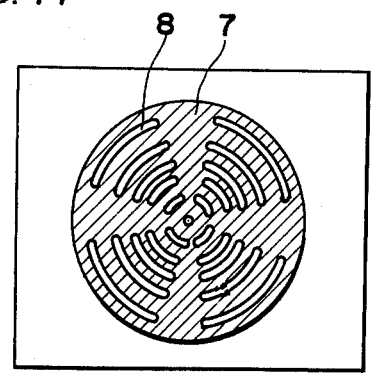

In the modification of FIG. 11, four sets of arcuate slots 8 with each set equally spaced from each other are radially, concentrically formed in the metallic plate 7 for surface wave propagation, in which modification, it goes without saying that the metallic plate 7 may be replaced by a dielectric material with the slots 8 also replaced by corresponding pieces of metal.

Figure 12:
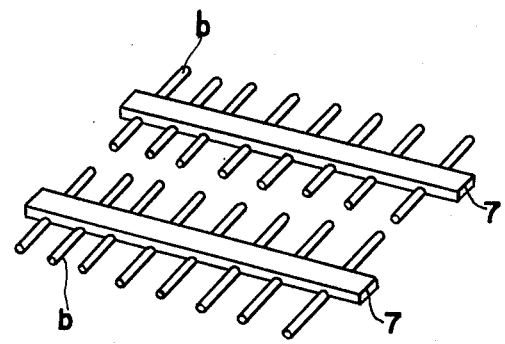

In the modification of FIG. 12, a plurality of equally spaced short bars $b$ are fixed to each of a pair of long, thin plates 7 in a direction to the axis of plates 7, thus providing an appearance such as in a UHF antenna for TV reception, in which surface wave transmission line, improved surface wave propagation is also taken into account As is clear from the foregoing embodiment and the modifications thereof, it is quite apparent to those skilled in the art that the surface wave transmission line to be employed in the apparatus of the present invention may be of any configuration so long as the metallic parts thereof are substantially disposed at regular intervals, and as long as the arrangement of such parts is not limited to the same plane, but may be of cubic construction with the effect therefrom being substantially identical. It should also be noted that a simple dielectric plate without having the periodic nature as described hereinbefore may be employed for the surface wave transmission line as well.

Figure 13:
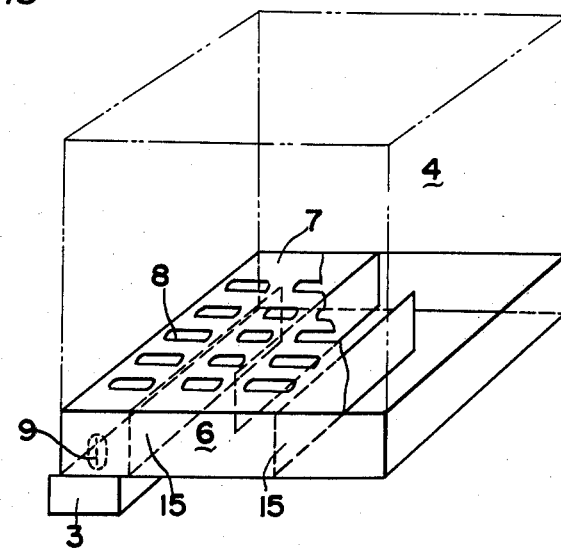
FIG. 13 is a schematic perspective view of the heating apparatus according to another embodiment of the present invention.

Referring now to FIGS. 13 to 14, there are shown still further modifications of the apparatus of the invention. In the modification of FIG. 13 the metallic plate 7 is formed with three sets of a plurality of equally spaced slots 8. The metallic plate 7 may, of course, be replaced by a dielectric material, for example plastic material, with the slots 8 similarly replaced by pieces of metal. The modification of FIG. 13 is characterized in that a plurality of metallic partition plates 15 extending downwardly at right angles from the lower surface of the plate 7 are disposed in the electric wave passage 6 below the plate 7 in a direction parallel to the axis of the row of slots 8 with the partition plates 15 suitably spaced from each other for substantially regulating the distribution of the electric waves in the passage 6, by which regulation, the state of the surface wave to be propagated can also be regulated with the energy distribution in the heating space 4 consequently being controlled to a desired condition. The means for such regulation not necessarily be of the planar construction shown in the modification of FIG. 13, but may be of a ridge shape formed by arranging rectangular conductive bars or of any configuration composed of members such as metal in the needle shape, or dielectric, which will essentially influence the distribution of the electric wave energy distribution in the passage 6. If necessary, such electric wave regulating members may be adapted to be movable for making the energy distribution uniform.

Reference is made to FIG. 14 showing another modification of the apparatus according to the invention. In this modification, although the construction of the apparatus casing 2 and the position of the microwave assembly 3 with the antenna 9 thereof projecting into the heating chamber 4 is similar to the embodiment of FIG. 3, a partition plate 4a spaced away from the rear wall 2c to a certain extent and bent at the lower portion thereof toward the rear wall 2c is installed in the heating chamber 4, thus forming a small chamber 4b between the bottom plate 10 and the lower bent portion of the partition plate 4a, into which small chamber 4b project the antenna of the microwave, with the chamber 4b communicating with the heating chamber 4. The plate 7 in this embodiment extends, at one edge thereof, into the small chamber 4b up to a position close to the antenna 9, thus defining two passages 17 and 18 from the chamber 4b. A cover plate 11 of electric wave penetrating material, for example of plastic, is placed on the plate 7 at the portion thereof located in the heating chamber 4 so a to cover the slots 8 of the plate 7. A damper plate 16 of metallic material is pivotally connected, at one edge thereof, to the portion of the partition plate 4a where the latter is bent toward the rear wall 2c for pivotal rotation of the plate 16 within the passage 18. Depending on the specific construction, the damper plate 16 may be dispensed with. The apparatus of the invention in FIG. 14 is characterized in that the microwave radiated from the antenna 9 are divided into two portions in the passages 17 and 18, i.e., one passing into the wave passage 6 through the passage 17 for propagating the surface wave and the other directly radiated into the heating chamber 4 through the passage 18. It should be noted that part of the microwaves passing through the passage 18 travels along the surface wave transmission line 14 to form the surface wave thereon. Accordingly, in the apparatus of FIG. 14, objects too thick to be sufficiently heated only by the surface wave can be fully heated. Furthermore, by the adjustment of the of opening of the metallic damper plate 16, the ratio of the above described divided waves can readily be varied to suit the specific situation. It is needless to say that the surface wave transmission line 14 described as employed in the modification of FIG. 14 may be replaced by any of the modified transmission lines 14 earlier mentioned.

Figure 21:
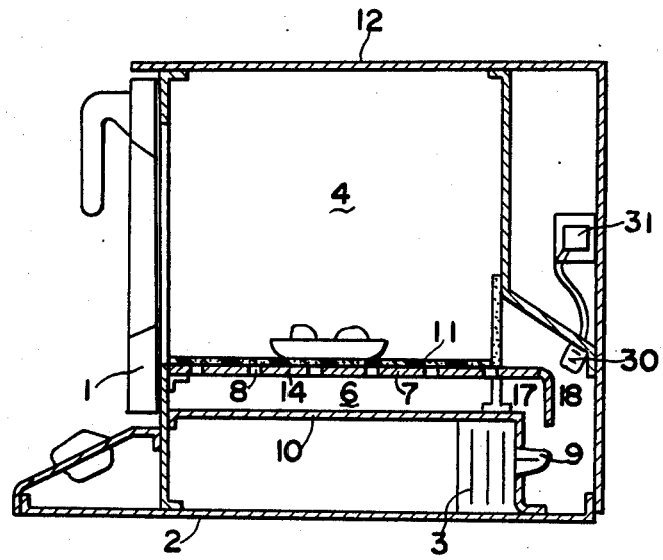
FIG. 21 is a schematic side sectional view of the heating apparatus according to a still further embodiment of the present invention.

Referring to FIG. 21, there is shown a modification of the apparatus of FIG. 14. In this modification, the damper plate 16 as a microwave switching means is replaced by electrical means, employing a discharge tube 30 with the antenna 9 of the microwave assembly 3 directed toward the rear wall 2c, although other constructional features of the apparatus are similar to those shown in FIG. 14. The discharge tube 30 is mounted on the bent portion of the partition plate 4a close to the edge thereof which is fixed to the wall 2c, with a power source 31 for the tube 30 fixedly mounted on the rear wall 2c in a space defined by the partition plate 4a and the rear wall 2c for controlling the discharge of the tube 30, and with the discharge tube 30 adapted to start discharging when voltage is supplied thereto through the power source 31. Upon starting of the discharge, an electric current flows in this portion of the apparatus, causing such portion to function as if there is provided a conducting bar therein. Accordingly, the electric wave energy in the passage 18 is prevented from entering the heating chamber 4 by the discharge from the discharge tube 30. On the contrary, if no voltage is supplied to the tube 30 through the power source 31, the microwave energy is not shielded in the portion of the passage 18 and consequently propagated into the heating chamber 4.

As is clear from the above description, in the heating apparatus of the invention, variation of the ratio of the surface wave energy to electric wave energy other than the surface wave energy can be effected either mechanically or electrically.

Referring now to FIG. 15, there is shown another modification of the heating apparatus of the invention. In this modification, a plate 10 spaced from the upper wall 2a is provided in the casing 2 and the microwave assembly 3 is disposed in the space defined by the plate 10 and the upper wall 2a at a central portion of the plate 10 with the antenna 9 of the assembly 3 projecting downwardly the interior of the casing 2. A partition plate 19 of an L shaped cross section having an opening 19a on the upper portion thereof and spaced away from the plate 10 and the rear wall 2c to a certain extent defines the heating chamber 4 on the surface wave transmission line 14, thus forming a wave passage 6a for leading the electric waves radiated from the antenna 9 to the surface transmission guide 14 around the chamber 4, which passage 6a is communicated with the passage 6 formed between the surface wave transmission line 14 and the lower wall 2b of the casing 2. The surface wave transmission line 14 employed in the above modification is of dielectric, material and is adapted to function as a surface wave transmission line through proper selection of the thickness thereof. In the apparatus of FIG. 15, the microwaves radiated from the antenna 9 are divided into two waves, i.e., these represented by the symbol P which are directly radiated from the antenna 9 and those shown by the symbol Q which propagate the surface wave tranmission line 14, so that an effect similar to that described in the modification of FIG. 14 can be expected.

Reference is made to FIG. 16 showing a further modification of the apparatus of FIG. 15. In this modification, the partition plate 19 is dispensed with. A plate 20 of electric wave penetrating material, for example, of plastics which is provided below the plate 10 in spaced relation thereto is merely for covering purposes. In the above modified apparatus of the invention, the electric waves radiated are composed of the waves R for propagating the surface wave and the waves V directly radiated from the antenna 9.

Figure 17:
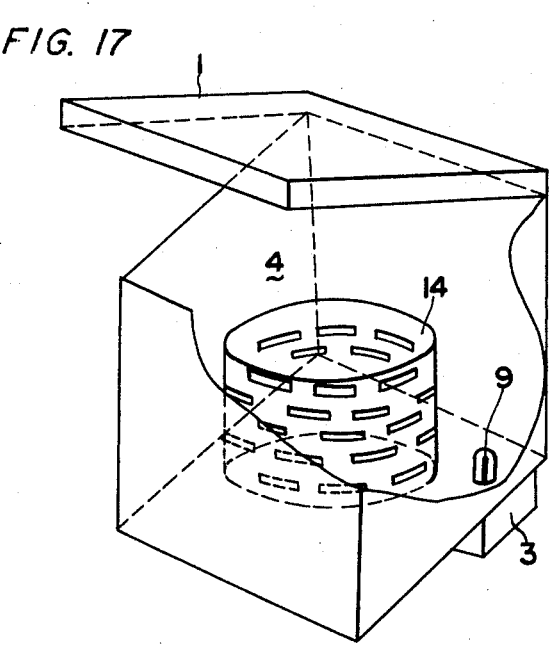
FIG. 17 is a schematic perspective view, with a portion broken away, of the heating apparatus according to a still further embodiment of the present invention.
Figure 18:
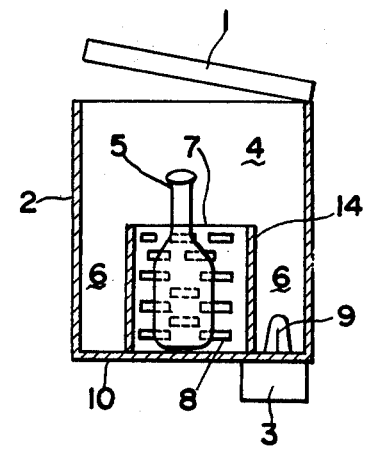
FIG. 18 is a schematic side sectional view, on a reduced scale, of the heating apparatus shown in FIG. 17.

Reference is now made to FIGS. 17 and 18 showing still another modification of the present invention. In this modification, the plate 7' for the surface wave transmission line 14' is formed into a cylindrical configuration which is placed in the central portion of the lower wall 2b' of the casing 2', lower wall 2b' also serving as the plate 10 in the embodiment of FIG. 2. A door plate 1' is pivotally connected, at one side edge thereof, to the upper edge of the wall 2c' for selectively opening or closing the opening O formed in the upper portion of the casing 2' and defined by the side walls of the casing 2'. The microwave assembly 3 in this modification is attached to the under surface of the lower wall 2b' at a position close to the rear wall 2c' of the casing 2' with the antenna 9 thereof projecting into the wave passage 6 formed between the side walls of the casing 2' and the outer periphery of the cylindrical plate 7' which has a plurality of slots 8 therein. In the above modification, the cylindrical plate 7' for the surface wave transmission line 14 is thus disposed in the position where increase of the density of heating is particularly desired. In the above arrangement, the disadvantage inherent in conventional electronic ovens that when an object having considerable height, such as a milk bottle, or a "sake" (Japanese wine) bottle etc., is to be heated in such ovens, only the portion in the vincinity of the bottle neck is heated too soon, is advantageously eliminated by providing the surface wave transmission line so as to surround the lower portion of the bottle for improving heat density thereabout. As is seen from the above modification, heat density at a desired portion relative to the object to be heated can be varied to suit a given purpose by disposing the surface wave transmission line 14 of any desired configuration with the wave passage 6 formed behind the transmission line 14.

Figure 19:
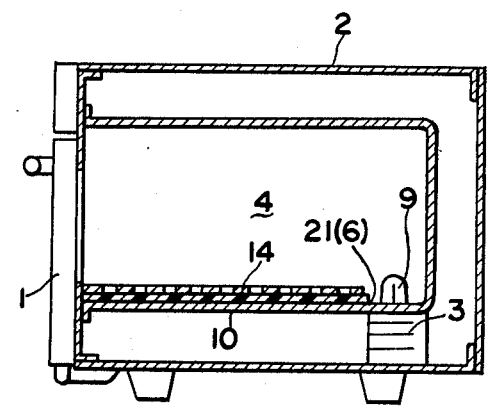
FIG. 19 is a schematic side sectional view of the heating apparatus according to a still further embodiment of the present invention.

Reference is made to FIG. 19, wherein a still further modification of the heating apparatus of the invention is shown. In this modification, the wave passage 6 formed as a space in the modifications hereinbefore described is replaced by a plate 21 of dielectric material, for example, of plastics, glass or ceramics disposed below the surface wave transmission line 14 on the plate 10 of U shaped cross section which defines the heating chamber 4 in the casing 2 with a space maintained between the plate 10 and the walls 2a, 2c and 2b. The microwave assembly in this modification is disposed in the space between the lower portion of the plate 10 below the transmission line 14 and the lower wall 2b of the casing 2 in a position adjacent to the rear wall 2c with the antenna 9 of the assembly 3 projecting into the heating chamber 4 in a position adjacent to one edge of the dielectric plate 21. The dielectric plate 21 in this modification serves as a wave passage 6 below the transmission line 14.

Figure 10:
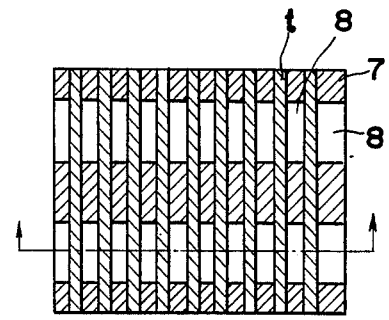
Figure 10:
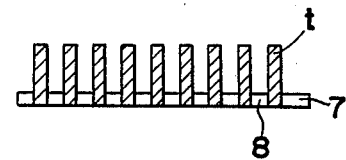
Figure 20:
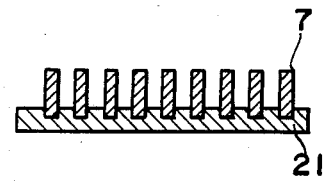
FIG. 20 is a schematic diagram showing a further modification of the surface wave transmission circuit.

Referring to FIG. 20, the above described conception in the apparatus of the modifications of FIG. 19 is applied to the surface wave transmission line shown in FIG. 10. In FIG. 20, a set of a plurality of metal pieces $t'$ equally spaced from each other are fixedly mounted on a support member 7" dielectric material. As described above, if a surface wave transmission line formed by a combination of a electric wave tranmission line portion and a metallic structure of periodic nature is prepared, it is possible to effect surface wave heating by merely disposing such a surface wave transmission line in the heating chamber.

All of the devices of the invention in the modifications hereinbefore described comprise an apparatus casing of box-like shape, and an opening defined by the side walls of the apparatus for inserting objects to be heated therethrough, a heating chamber formed in the casing and a door for selectively opening or closing such opening, which arrangement is based on the consideration for preventing human hands etc., from approaching by mistake the space in which the electric waves are being radiated, and remarkably effective for ensuring safety in general to family members who utilize such heating devices. It is needless to say that, depending on the design of the apparatus, the side walls and the door are not necessarily of totally metallic material, but may be partly formed by dielectric material such as plastics, provided that the electric waves employed are wholly of surface waves, even in which case, however, at least one of the side walls of the casing will have to be of metallic material for safety.

Furthermore, for increased safety, it may be necessary to provide known electric wave shielding devices in the vicinity of the door or to employ safety switches associated with the opening and closure of the door.

Additionally, in cases where both the surface wave transmission line and the side walls of the heating chamber are formed by metallic materials, certain inconveniences may result due to possible spark discharges at the portions where the surface transmission line and the side walls are located too close to each other or in contact with each other. For the prevention of such inconveniences, it may be necessary to apply resinous material onto the edge portions of the surface wave transmission line, to insert dielectric between the transmission line and the side walls, or either to weld both or to secure the transmission line to the side walls by securing screws, which countermeasures, however, are quite apparent to those skilled in the art and can be readily dealt with for incorporation into the devices.

What is claimed is:

1. A microwave heating apparatus comprising:
   a casing formed of electrically conductive metallic material and having an opening therein, a door closing said opening, said door and casing defining an enclosed chamber;
   a surface wave transmission line positioned within said chamber and dividing said chamber into a heating space for receipt of an object to be heated and a transmission space, said transmission space extending continuously along the entire area of one side of said surface wave transmission line; and
   a source of microwave power for generating microwaves, at least a portion of the energy from said microwave power source being coupled to said transmission space, said transmission space comprising means for transmitting microwaves to said surface wave transmission line over the entire area of said one side thereof, such that said surface wave transmission line forms a surface wave transmission mode which propagates within said heating space at a wave length less than the free-space operating wave length.

2. A microwave heating apparatus as claimed in claim 1, wherein said surface wave transmission line comprises an electroconductive plate member having formed therein a plurality of independent high impedance patterns, said high impedance patterns being equally spaced from each other by a distance not more than one-fourth of said free-space operating wave length.

3. A microwave heating apparatus as claimed in claim 2, wherein each of said impedance patterns is a slot.

4. A microwave heating apparatus as claimed in claim 1, wherein said surface wave transmission line comprises a dielectric plate member having formed therein a plurality of independent electroconductive patterns, said electroconductive patterns being equally spaced from each other by a distance not more than one-fourth of said free-space operating wave length.

5. A microwave heating apparatus as claimed in claim 1, wherein said surface wave transmission line comprises a plurality of metallic, electroconductive rods arranged on the same plane and spaced from each other by a distance not more than one-fourth of said free-space operating wave length.

6. A microwave heating apparatus as claimed in claim 1, wherein said transmission space is filled with a dielectric material.

7. A microwave heating apparatus as claimed in claim 1, wherein said spatial means has metallic electroconductive elements arranged therein for regulating the microwaves so as to propagate in a substantially zig-zag manner in the direction of transmission thereof.

8. A microwave heating apparatus comprising:
   a casing formed of electrically conductive metallic material and having an opening therein, a door closing said opening, said door and casing defining an enclosed chamber;
   a surface wave transmission line positioned within said chamber and dividing said chamber into a heating space for receipt of an object to be heated and a transmission space, said transmission space extending continuously along the entire area of one side of said surface wave transmission line;
   a source of microwave power for generating microwaves, the energy from said microwave power source being coupled to both said heating space and said transmission space, said transmission space comprising means for transmitting microwaves to said surface wave transmission line over the entire area of said one side thereof, such that said surface wave transmission line forms a surface wave transmission mode which propagates within said heating space at a wave length less than the free-space operating wave length; and
   means for selectively controlling respective amounts of said energy to said transmission space and said heating space and to thereby control the ratio of energy between said surface wave transmission mode within said heating space and a mode supplied directly into said heating space.

9. A microwave heating apparatus as claimed in claim 8, wherein said controlling means comprises a pivotally supported electroconductive member.

10. A microwave heating apparatus as claimed in claim 8, wherein said controlling means comprises a variable impedance element.

11. A microwave heating apparatus as claimed in claim 10, wherein said variable impedance element is a discharge tube.

12. A microwave heating apparatus as claimed in claim 8, wherein said surface wave transmission line comprises an electroconductive plate member having a plurality of high impedance patterns which are constituted by at least one group of slots equally spaced from each other a distance not more than one-fourth of the free-spacing operating wave length of the microwaves and communicated to each other by at least one slot.

* * * * *

UNITED STATES PATENT AND TRADEMARK OFFICE
CERTIFICATE OF CORRECTION

PATENT NO. : 4,019,009
DATED : April 19, 1977
INVENTOR(S) : Shigeru KUSUNOKI, Teruhisa TAKANO, Noboru KURATA It is certified that error appears in the above-identified patent and that said Letters Patent are hereby corrected as shown below:

Claim 7, line 2, delete "spatial means" and insert therefor
-- transmission space --.

Signed and Sealed this

Twenty-eighth Day of February 1978

[SEAL]

Attest:

RUTH C. MASON
*Attesting Officer*

LUTRELLE F. PARKER
*Acting Commissioner of Patents and Trademarks*